United States Patent [19]
David

[11] 4,095,681
[45] Jun. 20, 1978

[54] SAFETY BRAKING DEVICE FOR A UNIT MOVING ALONG A SURFACE, IN PARTICULAR FOR A LIFT CAR

[76] Inventor: Pierre Marcel David, Le Pre Fleuri - rue Sylvain Vigneras, 92380 Garches, France

[21] Appl. No.: 770,142

[22] Filed: Feb. 18, 1977

[30] Foreign Application Priority Data

Feb. 23, 1976 France .................................. 76 04886

[51] Int. Cl.² .............................................. B60T 8/02
[52] U.S. Cl. ................................. 188/187; 74/781 R; 187/89; 188/72.8; 188/134; 192/94; 192/103 A
[58] Field of Search ..................... 188/72.1, 72.8, 134, 188/187; 192/94, 103 A; 74/781 R; 187/89

[56] References Cited

U.S. PATENT DOCUMENTS

| | | | |
|---|---|---|---|
| 1,656,577 | 1/1928 | Wheeler | 188/72.8 X |
| 2,155,132 | 4/1939 | Henriod | 192/103 A X |
| 2,672,965 | 3/1954 | Miller | 192/103 A |
| 3,419,118 | 12/1968 | Allaben, Jr. | 192/94 X |
| 3,674,119 | 7/1972 | Worstell et al. | 188/134 |

*Primary Examiner*—George E. A. Halvosa
*Attorney, Agent, or Firm*—Wenderoth, Lind & Ponack

[57] ABSTRACT

The safety braking device comprises a case for mounting on the unit and in which there is journalled a shaft carrying a drive wheel engaged with a surface along which surface the unit moves. Fixed brake discs prevented from rotating with respect to the case are interposed between movable discs mounted on the shaft to rotate with the shaft. Screws extend through the movable discs and each have a head at one end and a gear pinion screwthreadedly engaged on the opposite end of the screws for axially tightening the discs together. The gear pinions are meshed with a gear wheel fixed to a support member which is mounted on the shaft to be rotatable by the shaft through the effect of friction between the shaft and support member. A centrifugal element is movably mounted on the support member and is capable of encountering an abutment, fixed relative to the case, when the support member is rotated beyond a reference speed and thus causes the gear wheel to rotate the gear pinions and tighten the discs together and apply the brake.

9 Claims, 6 Drawing Figures

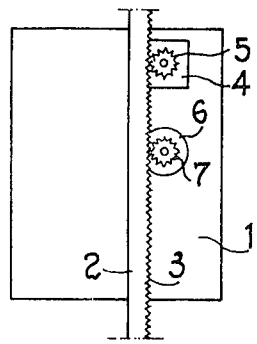
FIG_1
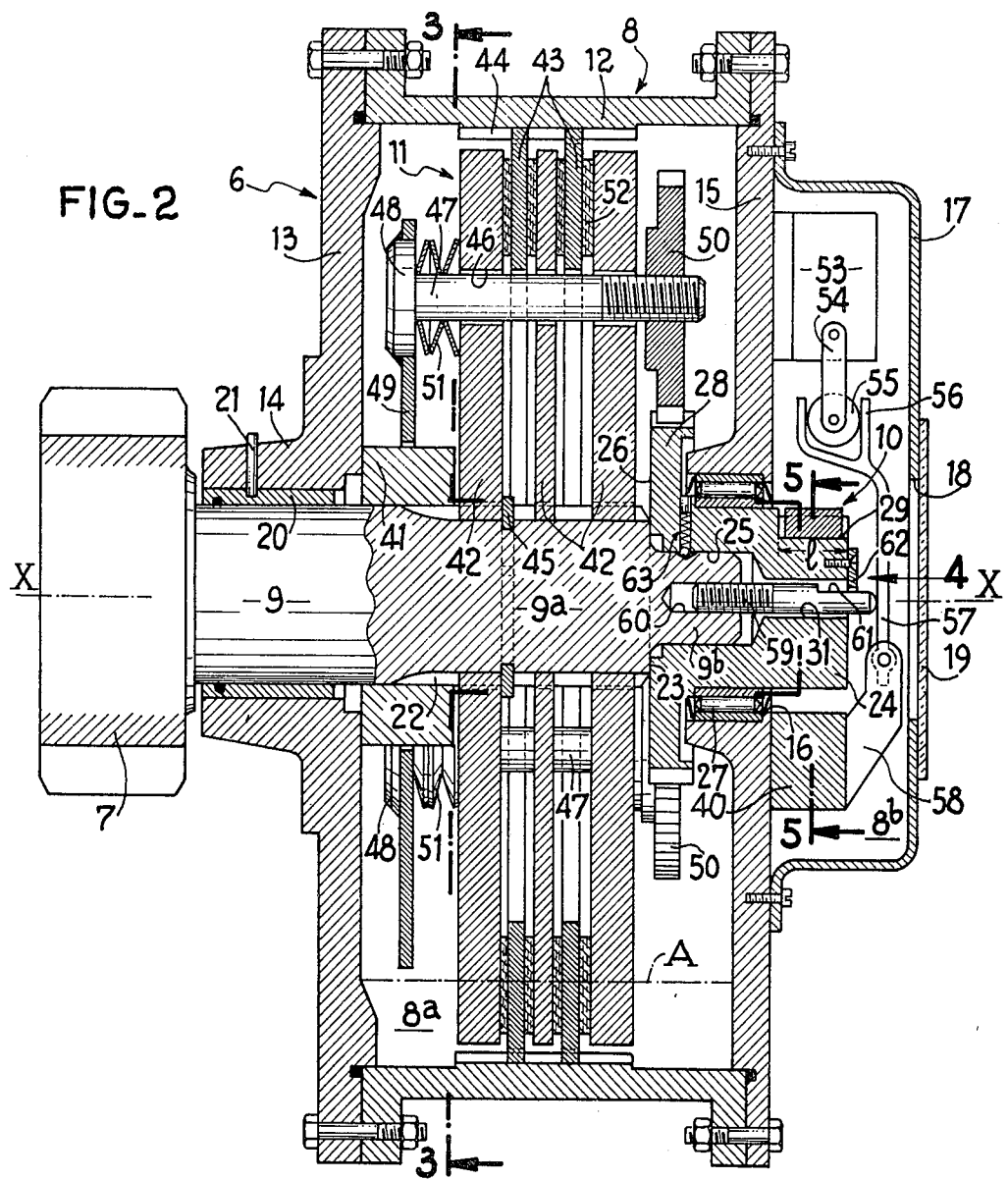
FIG_2

SAFETY BRAKING DEVICE FOR A UNIT MOVING ALONG A SURFACE, IN PARTICULAR FOR A LIFT CAR

The present invention relates to a safety braking device intended to be mounted on a unit which moves along a surface and to stop this moving unit as soon as it exceeds a predetermined reference or set speed. The invention is in particular applicable to cars or lifts or elevators for scaffolding or the like, and more particularly concerns braking devices of the type comprising a case which may be fixed to the moving unit and in which there is journalled a shaft carrying at one end, outside the case, a drive wheel which is in slip-free engagement with said surface and carries, inside the case, a centrifugal element, the device further comprising a fixed brake shoe integral with the case and a moving brake shoe adapted to be progressively urged against the fixed shoe under the effect of an axial screwing when the centrifugal element engages an abutment provided in its radial plane.

French Pat. No. 521,998 discloses such a device. In this known device the two brake shoes constitute a conical drum brake. The abutment is carried by the moving shoe in which the shaft is freely rotatably mounted and which has a screwthreaded extension engaged in a tapped sleeve integral with the case. When the centrifugal element, which is constituted by an arm pivotally mounted on the shaft, engages the abutment, it drives the movable shoe in rotation which produces a screwing of the extension of this shoe in the tapped sleeve and consequently causes this movable shoe to be urged against the fixed shoe.

Such a device has serious drawbacks. First, when the centrifugal element does not engage the abutment, that is to say when it is in the normal inoperative state of the device, the two shoes are in contact but held stationary relative to each other. Consequently, in the course of time, important modifications in the coefficient of friction of these shoes occur and they deteriorate in an unforseeable manner owing, for example, to variations in atmospheric conditions. Consequently, when the safety device must operate, nothing ensures the effectiveness of the braking. Moreover, the centrifugal element itself drives the movable shoe in rotation to achieve the braking. It must therefore withstand the whole of the required braking torque, which requires an excessive size of this centrifugal element which is incompatible with the high sensitivity required thereof. Finally, if, subsequent to the application of the brake, the centrifugal element, which is held against rotation, is disengaged from the abutment, the shaft is released and the moving unit once again moves until the centrifugal element once again engages the abutment which then suddenly connects the shaft with a brake which is already applied. The assembly of the device is then liable to break.

An object of the invention is to provide a safety braking device which avoids these drawbacks in a simple and cheap manner and assures even, after a long period of inactivity, a reliable and progressive braking of the moving unit.

According to the invention, there is provided a safety braking device for a unit movable along a surface, in particular for a lift car, comprising a case capable of being fixed to the moving unit and in which case there is journalled a shaft carrying at one end, outside the case, a drive wheel in slip-free engagement with said surface, fixed discs integral with the case and interposed between movable discs integral with the shaft, means for axially urging together the discs comprising a screwthread in engagement with a screwthread integral with the movable disc, toothing and a toothed support member meshed with said toothing and carrying a centrifugal element, wherein the centrifugal element is adapted to engage an abutment which is fixed relative to the case.

With such an arrangement, the movable shoe is driven in rotation as soon as the movable unit moves, which produces a permanent sliding between the two shoes and ensures a reciprocal self-maintenance or self-servicing of said shoes. Owing to the fact that the centrifugal element does not drive the movable shoe directly, but means for exerting an axial thrust on the movable shoe to urge it against the fixed shoe, this centrifugal element does not have to withstand the breaking torque. Consequently, it is possible to employ a small centrifugal element which is very cheap and very sensitive.

In a preferred embodiment of the invention, the brake shoes are constituted by radial discs. Thus the friction surfaces are planar and this ensures that there is no wedging between the two shoes before the centrifugal element engages the abutment.

Advantageously, the abutment is fixed to the case and the centrifugal element is carried by a support member which is mounted on and frictionally engages the shaft and is provided with a gear wheel, the axial thrust means comprising a screw which freely extends through the movable disc and on the end of which screw there is screwthreadedly engaged a gear pinion meshed with the gear wheel. This constitutes a particularly simple and effective embodiment of the axial thrust means.

Further features and advantages of the invention will appear from the ensuing description which is given solely by way of example with reference to the accompanying drawings in which:

FIG. 1 is a diagrammatic elevational view of a lift car equipped with a safety braking device according to the invention;

FIG. 2 is an axial sectional view, to an enlarged scale, of the braking device;

Figure 3:
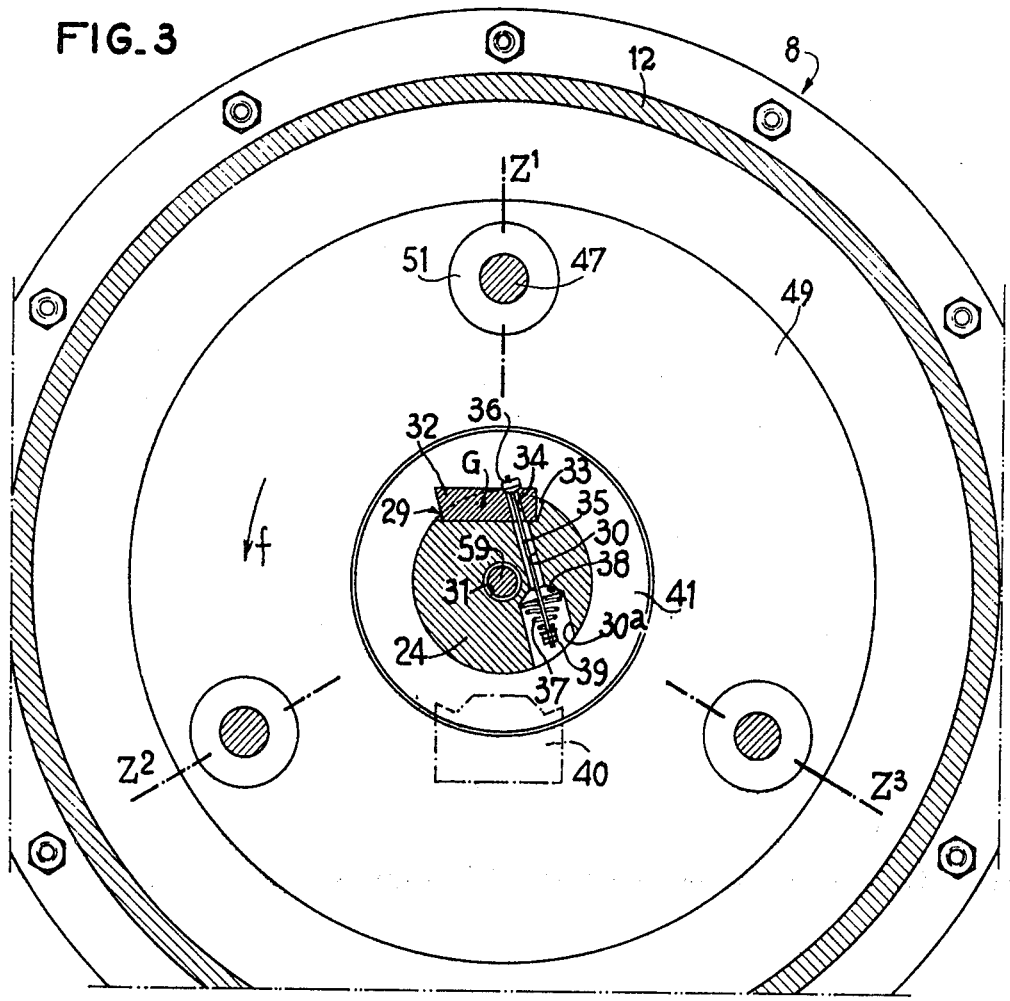
FIG. 3 is a sectional view taken on line 3—3 of FIG. 2, some parts not being shown in section in order to render the drawing more clear.

The lift car 1 shown in FIG. 1 is movable along a vertical mast 2 which for example pertains to a scaffolding and is provided on one side with a rack 3. The car 1 is driven along the mast 2 by a drive motor 4 whose output shaft carries a drive gear pinion 5 permanently meshed with the rack 3. On the same side of the car 1 there is secured a safety braking device 6 provided with a gear wheel 7 which also is permanently meshed with the rack 3. The device 6 is adapted to stop the car 1 when, in the course of its descent, it exceeds a predetermined speed.

As can be seen in FIG. 2, the safety braking device 6 comprises a case 8, a shaft 9 having an axis X—X journalled in the case, a centrifugal assembly 10 and a brake 11. When the car 1 descends along the mast 2, the shaft 9 rotates in the direction of arrow f shown in FIG. 3.

The case 8 comprises a cylindrical median member 12 provided with end flanges, a first end wall 13 detachably and sealingly mounted on the member 12 and having a tubular projection 14 extending outwardly of the case, a second end wall 15 also detachably and sealingly secured to the member 12 and having a central aperture 16. A detachable cap 17 is fixed to the end wall 15 and has in facing relation to the opening 16 a window 18 covered with a transparent sheet 19. In use, the cap 17 is accessible from inside the lift car 1. Defined between the walls 13 and 15 is a first sealed chamber 8a containing the brake 11, and a second sealed chamber 8b defined between the cap 17 and the wall 15 and enabling the centrifugal assembly 10 to be observed.

The shaft 9 extends through the tubular projection 14 in a sealed manner with interposition of an anti-friction ring 20 which is prevented from rotating by a pin 21. The gear wheel 7 is keyed on the end of the shaft 9 which extends out of the tubular projection 14. Inside the case 8 the shaft 9 has a section 9a provided with splines 22 and is extended by a section 9b of smaller diameter, a radial shoulder 23 being formed between these two sections 9a and 9b. The end of the smaller section 9b is in the region of the opening 16 of the case 8.

The centrifugal assembly 10 comprises a support member 24 which is generally cylindrical and has the same diameter as the section 9b of the shaft 9. A radial end face 26 of the member 24 bears against the radial shoulder 23 of the shaft 9 and the member 24 extends entirely through the opening 16 of the case 8 with interposition of a rolling bearing 27 which is, for example, a needle bearing and is provided with suitable sealing means (not shown). Between the shoulder 23 of the shaft 9 and the opening 16 of the case 8, the member 24 is shaped in the form of a gear wheel 28. The free end of the member 24 extends into the observation chamber 9b of the case 8 and is provided with a recess 29. The latter, when viewed in cross section (FIGS. 3 and 4), has the shape of a triangle whose largest side 29a is curvilinear and constituted by the contour of the member 24. The other two sides of the triangle are rectilinear, the larger side 29b defining the bottom of the recess 29 and the smaller side 29c a roughly radial rear face of this recess, the term "rear" being with respect to the direction of rotation f. The sides 29b and 29c make therebetween an angle which is slightly larger than a right angle and for example equal to 100°.

The member 24 is provided with a transverse bore 30 which communicates with the bottom of the recess 29 and has at the other end a part 30a of larger diameter. An axial bore 31 also extends through the member 24 without encountering the bore 30. A weight or mass 32, the axial width of which is slightly less than the width of the recess 29 (FIG. 3), normally bears against the bottom of the recess. When viewed in cross section (FIG. 3), this weight has the shape of a right-angled trapezium, the right angle 32a of which coincides with the angle made by the rectilinear sides of the recess 29 and the acute angle of which projects beyond the periphery of the member 24.

In the position of rest of the weight 32, a free triangular space 33, having an apex angle of about 10°, is therefore formed between the rear face of the weight 32 and the rear face of the recess 29. A passage 34 extends throughout the weight 32. In the position of rest of the latter, this passage exactly prolongs the bore 30 of the member 24. A return rod 35 extends through the narrow part of the bore 30 and the passage 34 with clearance and is hooked onto the radially outer face of the weight 32 by a hook 36 and extends into the large part 30a of the bore 30. A conical coil spring 37 is compressed between the shoulder 38 between the two parts of the bore 30 and a nut 39 which is screwthreadedly engaged on the screwthreaded free end of the return rod 35. Note that the passage 34 does not pass through the centre of gravity G of the weight 32.

Figure 5:
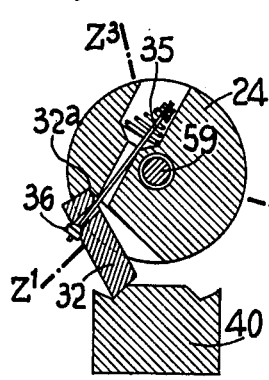
FIG. 5 is a sectional view, taken on line 5—5 of FIG. 2 of the device at the start of the braking.

As can be seen in FIGS. 2 and 5, a fixed abutment 40 is provided in the chamber 8b of the case in the radial plane of the weight 32 and is secured to the outer face of the end wall 15 of this case. The radial position of this abutment 40 is such that, when the weight 32 bears against the bottom of the recess 29, it passes very near to the abutment 40 but does not touch it. On the other hand, when the speed of rotation of the member 24 is high enough, centrifugal force causes the weight 32 to turn about its edge 32a, in opposition to the action of the spring 37, owing to the offset between the centre of gravity G of the weight and the passage 34, until the rear face of the weight is brought substantially in contact with the rear face of the recess 29. This weight then projects sufficiently radially from the member 24 to be no longer able to pass by the abutment 40 (FIG. 5).

The brake 11 comprises a series of discs which are alternately fixed and movable in rotation and are mounted to be axially slidable between the gear wheel 28 of the member 24 and an annular spacer member 41 which is disposed around the shaft 9 and bears against the inner face of the end wall 13 of the case 8. The set of discs comprises three movable discs 42, keyed on the section 9a of the shaft 9, and two discs 43 which are fixed against rotation and keyed on their outer periphery on inner splines 44 of the member 12 of the case 8. The movable disc 42 the nearest to the spacer member 41 is disposed between the spacer member and a circlip 45 received in a groove in the shaft 9 with a certain clearance so that it is axially freely movable to a limited extent.

The three movable discs 42 are each provided with three orifices 46 which are spaced 120° apart (FIG. 3) and three screws 47 freely extend through the corresponding sets of orifices of the three discs. Adjacent the spacer member 41, the screws 47 have a flat heat 48 which is welded in an aperture of a positioning ring 49 which is mounted to be freely rotatable about the spacer member 41. At their other ends which project from the stack of discs, a gear pinion is screwthreadedly engaged on each of the screws 47 and is permanently meshed with the gear wheel 28 of the member 24. Elastically yieldable means 51, which are normally at rest and are for example constituted by Belleville washers, are disposed between the head 48 of each screw 47 and the adjacent movable disc. The discs have an axial clearance so that annular friction elements 53 provided on the movable discs can, as soon as the shaft 9 rotates, slightly rub against the fixed discs. These friction elements are, for example, of sintered bronze and the fixed discs are of steel.

Figure 4:
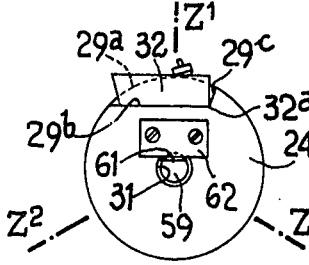
FIG. 4 is an end elevational view of a detail of this device in the direction of arrow 4 of FIG. 2.

The braking device 6 is also provided with a switch 53 actuated by a lever 54 which carries a roller 55 at its end. This roller is maintained between the two branches of a fork 56 provided at the end of a lever 57 whose other end is detachably pivotally mounted on a bracket 58 carried by the abutment 40. A screw 59 is screwthreadedly engaged in a blind taped aperture 60 formed in the narrow section 9b of the shaft 9 and freely extends through the smooth passage 31 which extends axially through the member 24 in coaxial relation to the latter. The free end of the screw 59 has a flat face 61 on which there bears a rectangular plate 62 which is secured to the end face of the member 24 so as to prevent the screw 59 from rotating (FIGS. 2 and 4). The free end of the screw 59 constantly bears against an intermediate point of the lever 57 owing to the action of a suitable elastic return or bias of the switch lever 54 to its position of rest.

The braking device just described operates in the following manner:

When the lift cage or car descends at normal speed, the gear wheel 7 and the shaft 9 rotate in the direction of arrow f. The rotating shaft 9 drives the three movable discs 42 through its splines 22, and the member 24 and the weight 32 by the effect of friction.

Note that the member 24 is driven not only by the effect of friction of the wall of the recess 25 on the narrow section 9b of the shaft 9, but also through the medium of the gear pinions 50, the sole resisting torque being produced by the friction in the rolling bearing 27 which is very low. For greater safety, by way of a modification, there may be provided in the member 24 between the gear wheel 28 and the roller bearing 27 one or more radial bores 63 in each of which there is disposed a spring biasing a ball which partially penetrates a recess in the section 9b of the shaft 9 as shown in FIG. 2.

So long as the speed of descent of the car 1 along the mast 2 does not exceed a predetermined reference speed, under the effect of the spring 37 the weight 32 remains in bearing relation to the bottom of the recess 29 or occupies a position of equilibirum which is such that it passes freely through the region of the abutment 40 without touching it. Under these conditions, the shaft 9, the three movable discs 42, the ring 49 and the member 24 rotate together and the gear pinions 50 do not rotate with respect to the gear wheel 28. During this movement, the friction elements 52 of the movable discs rub lightly and permanently against the fixed discs and thus ensure a self-cleaning of these friction elements and of the confronting friction surfaces.

As soon as the reference speed is exceeded, the speed of rotation of the shaft 9 and member 24 becomes such that, under the effect of centrifugal force, the rotation of the weight 32 about its edge 32a with respect to the member 24 becomes such that the weight is made to project sufficiently in the radial direction to be no longer able to pass by the abutment 40. Consequently, when the weight 32 arrives in front of the abutment 40 it strikes thereagainst and immediately stops the rotation of the member 24 on which it is mounted (FIG. 5). For reasons of clarity, the radial directions $Z^1$, $Z^2$ and $Z^3$ corresponding to the three screws 47 have been shown in FIGS. 4 and 5. As the shaft 9 continues to rotate and continues to drive the discs 42 and the three gear pinions 50, the latter start to roll around the gear wheel 28 which is held stationary and this causes these gear pinions to be screwed along the screws 47 and consequently causes a tightening of the stack of discs. The progressive compression of the washers 51, which occurs during this screwing, results in a progressive application of the brake. The pitch of the screws 47 and the characteristic of the washers 51 are so chosen as to ensure the complete stoppage of the shaft 9, and therefore of the car 1, at the end of a predetermined number of revolutions of the shaft 9. The choice of the weight 32 and spring 37, and the position of the nut 39 on the return rod 35, enable the reference speed to be easily regulated.

During this time, the screw 59, which is prevented from rotating in the member 24 and is screwed in the rotary shaft 9, progressively moves outwardly of the member 24 and urges the median part of the lever 57 and results, after a predetermined number of revolutions of the shaft 9, in the interruption of the supply of current to the device driving the car 1.

The torque that the weight 32 has to withstand during the application of the brake is much lower than the braking torque transmitted by the discs; for example, it may be of the order of one hundredth of this braking torque.

To put the safety device 6 back into the initial state, it is sufficient to remove the cap 17 from the case 8 and, by means of any suitable tool, turn the member 24 in the desired direction the number of revolutions required to ensure that the three gear pinions 50 whose axes are held stationary, move the required distance along the screws 47 toward the end of the latter and thereby release the tightening force exerted on the set of discs 42 and 43.

It will be observed that when the safety device has operated, the shaft 9 remains immobilized, even if the weight 32, which is no longer subjected to centrifugal force since the member 24 has stopped, is disengaged from the abutment 40 and returns to its position of rest. This constitutes an important advantage of this device.

Moreover, disposing the weight 32 in the chamber 8b of the case which is separate from the main chamber 8a containing the braking device, enables the weight to be always visible through the window 19 of the cap 17. Furthermore, the sealing of the chamber 8a containing the brake discs and not the weight 32 enables a bath of oil to be provided in the chamber 8a, for example up to the level A in FIG. 2, so that the automatic maintenance of the suitable condition of the surfaces of friction of the discs 42 and 43 is still further improved. Further, note that it is sufficient to modify the number of discs of the brake 11 to modify its power.

Figure 6:
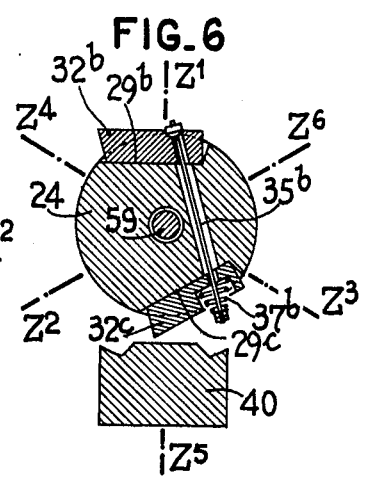
FIG. 6 is a partial diagrammatic view illustrating a modification of this device.

FIG. 6 shows diagrammatically how the same device may be extended to the case where the safety device must operate in both directions of movement of the car 1, that is to say, in both directions of rotation of the shaft 9. In this case, two notches 29b and 29c and two weights 32b and 32c are provided. These weights are elastically biased by the same return rod 35b which is provided with a conical coil spring 37b and extends with clearance through a bore 30b, formed in the member 24 and interconnecting the two notches, and two passages 34b and 34c which extend through the weights 32b and 32c. The two weights 32b and 32c and their respective recesses 29b and 29c are identical but oriented in opposite directions of rotation. Thus, for each of these directions of rotation, one of the two weights strikes against the single abutment 40 as soon as the reference speed is exceeded.

Further, the discs 42 are provided with a second set of aligned orifices spaced 120° apart and interposed between the first-mentioned orifices. These orifices are shown merely by their radial directions $Z^4$, $Z^5$ and $Z^6$ in FIG. 6. Introduced in these additional orifices are screws similar to the screws 47 but having a screwthread of opposite hand. Each screw carries a gear pinion meshed with the gear wheel 28.

This it will be understood that, irrespective of the direction of rotation of the shaft 9, as soon as the member 24 is blocked by one of the two weights, one of the two sets of gear pinions produces the tightening of the stack of discs, whereas the other set of three gear pinions moves in the direction for releasing the brake, all the advantages of the device being conserved.

It will be understood that the device 6 may be employed with other types of movable units which are driven, for example, by a chain or adherence and must not exceed a predetermined speed.

Having now described my invention what I claim as new and desire to secure by Letters Patent is:

1. A safety braking device for stopping a unit movable along a surface, in particular a lift car, when the speed of the unit becomes superior to a predetermined speed, comprising a case for fixing to the moving unit, a shaft rotatively mounted in the case and having one end outside the case, a drive wheel carried by said one end for slip-free engagement with said surface to be rotated by said surface upon said movement of said unit and thereby rotate the shaft, a disc assembly comprising fixed annular discs having an inner periphery and connected to be held against rotation relative to the case and movable discs connected to rotate with the shaft, the fixed discs being interposed between the movable discs and the fixed discs and movable discs being coaxial to and movable axially of the shaft, a support member connected to rotate with the shaft by releasable connecting means, a centrifugal element carried by the support member, an abutment which is fixed relative to the case, a gear wheel connected to rotate with the support member and coaxial with the shaft, axial thrust means for urging the discs together and comprising a thrust assembly comprising a screw which has a head located at one end of the disc assembly and extends freely through aligned openings of the movable discs and is disposed radially inwardly of said inner periphery and outwardly of the shaft and a gear pinion screwthreadedly engaged on the screw beyond an opposite end of the discs and meshed with the gear wheel, the centrifugal element being movable between a position of rest in which position it is incapable of encountering the abutment and an outer position in which outer position it is brought by the effect of centrifugal force and is capable of encountering the abutment and stopping rotation of the support member beyond a reference speed of rotation of the support member corresponding to said predetermined speed, said releasable connecting means being released and thereby allowing the stoppage of the support member while allowing rotation of the shaft when the centrifugal element encounters the abutment, whereby continued rotation of the shaft causes the pinion to roll around the gear wheel and move along said screw towards the screw head.

2. A device as claimed in claim 1, wherein said case has an end wall, the support member is mounted on an end of the shaft opposed to the drive wheel and extends through the end wall of the case beyond which end wall a detachable cap is mounted on the case and provided with a window and defines an observation chamber, the centrifugal element is contained in the observation chamber, and a rolling bearing is interposed between the shaft and the end wall of the case.

3. A device as claimed in claim 2, wherein the rolling bearing is sealed and the end of the shaft carrying the drive wheel also extends through the case in a sealed manner.

4. A device as claimed in claim 1, wherein the axial thrust means comprise a plurality of thrust assemblies each comprising said gear pinion and said headed screw, said thrust assemblies being equally spaced apart around the discs, all the gear pinions being meshed with said gear wheel.

5. A device as claimed in claim 1, comprising a recess in the support member, the centrifugal element comprising a weight which is movable radially of the support member in the recess, and a spring cooperative with the weight for biasing the weight into the recess.

6. A device as claimed in claim 5, wherein the spring has a line of action on the weight and the weight has a centre of gravity which is offset with respect to the line of action of the spring, the recess allowing the weight to undergo a limited movement of rotation about an edge of the weight.

7. A safety braking device for stopping a unit movable along a surface, in particular a lift car, when the speed of the unit becomes superior to a predetermined speed, comprising a case for fixing to the moving unit, a shaft rotatively mounted in the case and having one end outside the case, a drive wheel carried by said one end for slip-free engagement with said surface to be rotated by said surface upon said movement of said unit and thereby rotate the shaft, a disc assembly comprising fixed annular discs having an inner periphery and connected to be held against rotation relative to the case and movable discs connected to rotate with the shaft, the fixed discs being interposed between the movable discs and the fixed discs and movable discs being coaxial to and movable axially of the shaft, a support member connected to rotate with the shaft by releasable connecting means, a centrifugal element carried by the support member, an abutment which is fixed relative to the case, a gear wheel connected to rotate with the support member and coaxial with the shaft, axial thrust means for urging the discs together and comprising a thrust assembly comprising a screw which has a head located at one end of the disc assembly and extends freely through aligned openings of the movable discs and is disposed radially inwardly of said inner periphery and outwardly of the shaft and a gear pinion screwthreadedly engaged on the screw beyond an opposite end of the discs and meshed with the gear wheel, the centrifugal element being movable between a position of rest in which position it is incapable of encountering the abutment and an outer position in which outer position it is brought by the effect of centrifugal force and is capable of encountering the abutment and stopping rotation of the support member beyond a reference speed of rotation of the support member corresponding to said predetermined speed, said releasable connecting means being released and thereby allowing the stoppage of the support member while allowing rotation of the shaft when the centrifugal element encounters the abutment, whereby continued rotation of the shaft causes the pinion to roll around the gear wheel and move along said screw towards the screw head, the device further comprising a second thrust assembly comprising said headed screw and gear pinion similar to the first-mentioned thrust assembly but having an opposite hand of the screwthread of the screw, a second centrifugal element being carried by the support member and capable of engaging in the opposite direction of rotation of the shaft, a second abutment which is fixed relative to the case.

8. A safety braking device for a unit movable along a surface, in particular for a lift car, comprising a case for fixing to the moving unit, a shaft rotatively mounted in the case and carrying at one end, outside the case, a drive wheel for slip-free engagement with said surface to be rotated by said surface upon said movement of said unit, fixed discs connected to be held against rotation relative to the case, movable discs connected to rotate with the shaft, the fixed discs being interposed between the movable discs and the fixed discs and movable discs being movable axially of the shaft, a support member, a centrifugal element carried by the support member, an abutment which is fixed relative to the case, means connecting the support member to the shaft to be rotated by the shaft, means for axially urging the discs together for braking the shaft relative to the case, said urging means comprising first screwthreaded means, second screwthreaded means screwthreadedly engaged with the first screwthreaded means and combined with the movable discs to urge the discs together upon rotation of the first screwthreaded means, gear train means drivingly connecting the support member to the first screwthreaded means for rotating the first screwthreaded means upon rotation of the support member, the centrifugal element being movable between a position of rest in which position it is incapable of encountering the abutment and an outer position in which outer position it is brought by the effect of centrifugal force and is capable of encountering the abutment and stopping rotation of the support member beyond a reference speed of rotation of the support member, said means connecting the support member to the shaft being capable of allowing the stoppage of the support member while allowing rotation of the shaft when the centrifugal element encounters the abutment, the device further comprising a safety screw screwthreadedly engaged in an end of the shaft and extending through said support member, means for preventing the safety screw from rotating relative to the support member, a device for driving said unit, and a switch for controlling the operation of the unit-driving device, said safety screw being capable of moving axially of the shaft and engaging said switch for cutting off the supply of current to said unit-driving device a predetermined period after stoppage of the support member by the encounter of the centrifugal element with the abutment.

9. A safety braking device for stopping a unit movable along a surface, in particular a lift car, when the speed of the unit becomes superior to a predetermined speed, comprising a case for fixing to the moving unit, a shaft rotatively mounted in the case and having one end outside the case, a drive wheel carried by said one end for slip-free engagement with said surface to be rotated by said surface upon said movement of said unit and thereby rotate the shaft, a disc assembly comprising fixed annular discs having an inner periphery and connected to be held against rotation relative to the case and movable discs connected to rotate with the shaft, the fixed discs being interposed between the movable discs and the fixed discs and movable discs being coaxial to and movable axially of the shaft, a support member coaxially mounted on and frictionally connected to the shaft, a centrifugal element carried by the support member an abutment which is fixed relative to the case, a gear wheel connected to rotate with the support member and coaxial with the shaft, axial thrust means for urging the discs together and comprising a thrust assembly comprising a screw which has a head located at one end of the disc assembly and extends freely through aligned openings of the movable discs and is disposed radially inwardly of said inner periphery and outwardly of the shaft and a gear pinion screwthreadedly engaged on the screw beyond an opposite end of the discs and meshed with the gear wheel, the centrifugal element being movable between a position of rest in which position it is incapable of encountering the abutment and an outer position in which outer position it is brought by the effect of centrifugal force and is capable of encountering the abutment and stopping rotation of the support member beyond a reference speed of rotation of the support member corresponding to said predetermined speed, said frictional connection allowing the stoppage of the support member while allowing rotation of the shaft when the centrifugal element encounters the abutment whereby continued rotation of the shaft causes the pinion to roll around the gear wheel and move along said screw towards the screw head.

* * * * *